United States Patent [19]

Dao

[11] Patent Number: 4,921,515
[45] Date of Patent: May 1, 1990

[54] ADVANCED REGENERATIVE ABSORPTION REFRIGERATION CYCLES

[76] Inventor: Kim Dao, 14 Nace Ave., Piedmont, Calif. 94611

[21] Appl. No.: 260,430

[22] Filed: Oct. 20, 1988

[51] Int. Cl.[5] .............................................. F25B 7/00
[52] U.S. Cl. ....................................... 62/335; 62/476
[58] Field of Search ........................... 62/332, 335, 476

[56] References Cited

U.S. PATENT DOCUMENTS

| | | | |
|---|---|---|---|
| 2,350,115 | 5/1944 | Katzow | 62/335 X |
| 3,483,710 | 12/1969 | Bearint | 62/335 X |
| 3,641,784 | 2/1972 | Schlichtig | 62/476 |
| 3,742,728 | 7/1973 | Mamlya | 62/476 |
| 4,329,851 | 5/1982 | Bourne | 62/476 X |
| 4,441,332 | 4/1984 | Wilkinson | 62/476 X |
| 4,542,628 | 9/1985 | Sarkisian et al. | 62/335 |
| 4,551,991 | 11/1985 | Miyoshi et al. | 62/476 |
| 4,553,409 | 11/1985 | Furukawa | 62/476 |
| 4,594,857 | 6/1986 | Mucic | 62/476 X |
| 4,615,177 | 10/1986 | Lane et al. | 62/476 X |
| 4,667,485 | 5/1987 | Ball et al. | 62/335 |
| 4,732,008 | 3/1988 | De Vault | 62/335 X |
| 4,827,728 | 5/1989 | De Vault et al. | 62/332 X |

Primary Examiner—Lloyd L. King
Attorney, Agent, or Firm—L. E. Carnahan; Roger S. Gaither; William R. Moser

[57] ABSTRACT

Multi-effect regenerative absorption cycles which provide a high coefficient of performance (COP) at relatively high input temperatures. An absorber-coupled double-effect regenerative cycle (ADR cycle) (10) is provided having a single-effect absorption cycle (SEA cycle) (11) as a topping subcycle and a single-effect regenerative absorption cycle (1R cycle) (12) as a bottoming subcycle. The SEA cycle (11) includes a boiler (13), a condenser (21), an expansion device (28), an evaporator (31), and an absorber (40), all operatively connected together. The 1R cycle (12) includes a multi-stage boiler (48), a multi-stage resorber (51), a multisection regenerator (49) and also uses the condenser (21), expansion device (28) and evaporator (31) of the SEA topping subcycle (11), all operatively connected together. External heat is applied to the SEA boiler (13) for operation up to about 500 degrees F., with most of the high pressure vapor going to the condenser (21) and evaporator (31) being generated by the regenerator (49). The substantially adiabatic and isothermal functioning of the SER subcycle (12) provides a high COP. For higher input temperatures of up to 700 degrees F., another SEA cycle (111) is used as a topping subcycle, with the absorber (140) of the topping subcycle being heat coupled to the boiler (13) of an ADR cycle (10). The 1R cycle (12) itself is an improvement in that all resorber stages (50b-f) have a portion of their output pumped to boiling conduits (71a-f) through the regenerator (49), which conduits are connected to and at the same pressure as the highest pressure stage (48a) of the 1R multistage boiler (48).

12 Claims, 2 Drawing Sheets

ADVANCED REGENERATIVE ABSORPTION REFRIGERATION CYCLES

The U.S. Government rights in this invention pursuant to Contract No. DE-AC03-76SF00098 between the U.S. Department of Energy and the University of California.

BACKGROUND OF THE INVENTION

The present invention relates to refrigeration cycles and more particularly to improved absorption cycles for producing refrigeration using high temperature heat as the driving source.

In an ideal reversible Carnot cycle, the efficiency of the cycle is $(T_2-T_1)/T_2$, wherein $T_2$ and $T_1$ are the high and low absolute temperatures of operation. Thus, for a given low refrigeration temperature $T_1$, the higher the input temperature level $T_2$, the greater will be the efficiency of operation. The coefficient of operation (COP) of a refrigeration cycle is the refrigeration work done divided by the heat energy put in. The maximum COP of a cycle operating between temperatures $T_2$ and $T_1$ is that of a Carnot cycle wherein all processes in the cycle are either adiabatic or isothermal.

The basic single-effect absorption cycle (referred to herein as an SEA cycle) has been used for decades. In such a cycle a working pair fluid, e.g., ammonia/water is heated to a temperature and pressure sufficient to boil off the ammonia ($NH_3$) as a vapor. The high-pressure ammonia vapor is next cooled in a condenser to liquify the ammonia, and the pressure of the liquid ammonia is then reduced so that it may boil at a low, refrigerating temperature. As the ammonia vaporizes in the evaporator, it absorbs heat from the cooling load. The ammonia vapor then goes to an absorber where it is absorbed back into low pressure water coming from the boiler, with the heat of absorption being rejected to a heat sink. The absorbed $NH_3$/water solution is then pumped back to the boiler to complete the cycle.

The basic SEA cycle has an undesirable characteristic in that it has an almost constant COP with increasing input temperature. Thus, even though a higher input temperature would normally be thought to provide higher performance from a more efficient cycle, such has not been the case.

A single-effect regenerative absorption refrigeration cycle (herein referred to as 1R cycle) has been proposed (Kim Dao, "A New Absorption Cycle: The Single-Effect Regenerative Absorption Cycle," Lawrence Berkeley Laboratory Report LBL-6879, February, 1978) to overcome the low performance of the basic SEA cycle. The 1R cycle operates with a multistage boiler and a multistage absorber in such a way that each stage of the heat input and heat rejection processes of the cycle occurs essentially at constant temperature rather than at constant pressure. The invention provides improvements in this 1R cycle, as well as in the combined cycles as will be shown in the preferred embodiment disclosed below. The greatest part of the high pressure refrigerant subsequently condensed is generated in an adiabatic multi-section regenerator wherein the greatest part of the heat necessary to generate the high pressure refrigerant comes from the absorption of the vapor from the evaporation into the very weak liquid solution leaving the boiler, this latter process taking place in the regenerator. The more nearly isothermal operation of the multistage boiler and the multistage absorber, and the more nearly adiabatic operation of the regenerator provides a greater COP of the cycle. However, for a desired refrigeration temperature, the previously proposed 1R cycle is limited by having a maximum input temperature which is relatively low.

SUMMARY OF THE INVENTION

It is the principle object of the present invention to provide an improved absorption cycle having a high COP which operates relatively close to the Carnot cycle at relatively high input temperatures.

Another object of the invention is to provide an improved refrigeration system having a relatively high input temperature while retaining a relatively low heat sink temperature.

Additional objects, advantages and novel features of the invention will be set forth in the description which follows, and in part will become apparent to those skilled in the art upon examination of the following, or may be learned by practice of the invention. The objects and advantages of the invention may be realized by the instrumentalities and combinations pointed out in the appended claims.

To achieve the foregoing and other objects, and in accordance with the invention, as described and broadly claimed herein, an advanced regenerative absorption refrigeration cycle is provided wherein a number of subcycles, the lowest of which is a single effect regenerative absorption cycle, are coupled to each other, with the heat produced in the absorber of a higher temperature subcycle being used as the heat input of the boiler in the next lower temperature subcycle.

A further aspect of this invention is that an absorber-coupled double-effect regenerative cycle (ADR cycle) is provided having a condenser, expansion device and an evaporator, the ADR cycle having an SEA topping subcycle with a boiler and an absorber and including said condenser, expansion device, and evaporator all operatively connected together, and a 1R bottoming subcycle having a multistage boiler, a multistage resorber and a multi-section regenerator including said condenser expansion device and evaporator, all operatively connected together, and in which the heat rejected from the SEA subcycle is heat coupled to the multistage boiler of the 1R subcycle.

A yet further aspect of this invention is that a triple-effect regenerative absorption cycle (TER cycle) is provided having an SEA topping subcycle with a boiler, a condenser, an expansion device, an evaporator and an absorber all operatively connected together, an ADR bottoming cycle, and in which the evaporator of the SEA topping cycle is heat coupled to the SEA boiler of the ADR bottoming cycle.

A still further aspect of this invention is an improvement in a 1R cycle wherein all resorber stages of the multistage resorber of the cycle have a portion of their outputs pumped to boiling conduits through the regenerator, which conduits are connected to and at the same pressure as the highest pressure stage of the multistage boiler of the cycle.

BRIEF DESCRIPTION OF THE DRAWINGS

The accompanying drawings, which are incorporated in and form part of this application, together with the description, serve to explain the principles of the invention.

DESCRIPTION OF THE PREFERRED EMBODIMENTS

ADR Cycle

Figure 1:
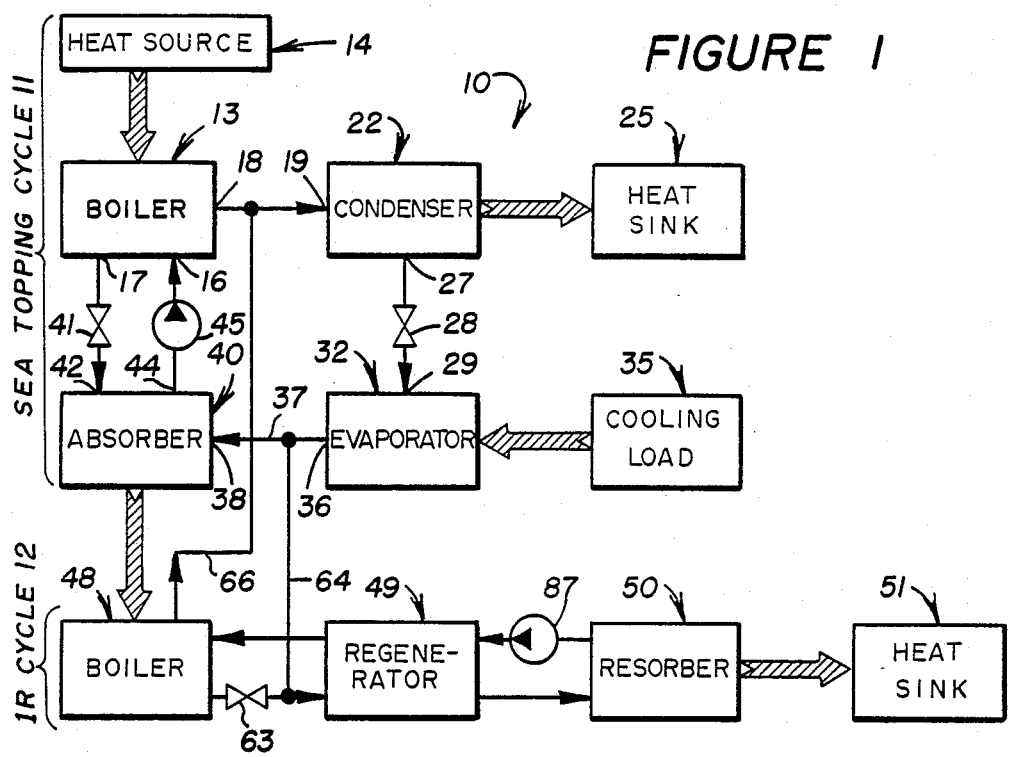
FIG. 1 is a block diagram of an absorber-coupled double-effect regenerative refrigeration cycle embodying the present invention.

Referring to the drawings, wherein preferred embodiments are shown, and in particular to FIGS. 1 and 2 wherein a first embodiment is shown, the multi-effect regenerative refrigeration cycle 10 includes two subcycles, a single-effect absorption topping cycle (SEA cycle) 11 and a single-effect regenerative absorption bottoming cycle (1R cycle) 12 which are fluidly connected to each other and thermally coupled, as more fully disclosed below, to form a multi-effect cycle referred to herein as an absorber-coupled double-effect regenerative cycle (ADR cycle).

Figure 2:
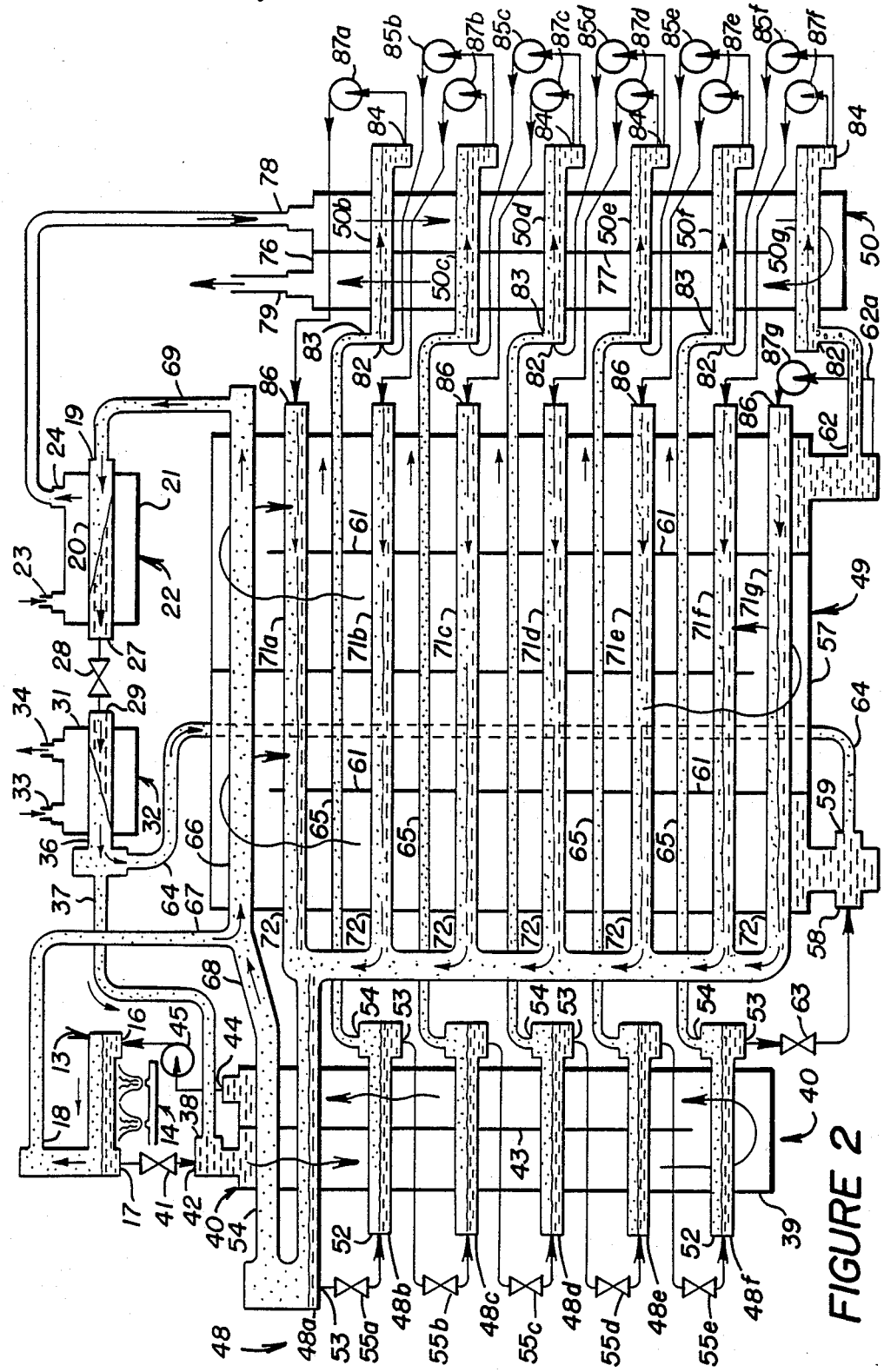
FIG. 2 is a generally schematic illustration of the refrigeration cycle of FIG. 1.

The SEA cycle 11 comprises a boiler 13 adapted to be heated by a heat source 14 such as the burners shown in FIG. 2. The thermal couplings of the cycle are represented in FIG. 2 by the shaded arrows, with the heat flow from hot to cold being in the direction of the arrows. The boiler 13 has an inlet 16, a liquid outlet 17 and a vapor outlet 18, the latter being connected to inlet 19 of the conduit 20 which passes through the interior of the shell 21 of the condenser 22. The condenser shell 21 has an inlet 23 and outlet 24 for passage of cooling water through the condenser. As indicated on FIG. 1, the cooling water constitutes a heat sink 25. The outlet 27 of tubing 20 is connected through a conventional expansion device, such as an expansion valve, 28 to the inlet 29 of the conduit 30 through the interior of the shell 31 of the evaporator 32. The evaporator shell 31 has an inlet 33 and outlet 34 for fluid connections to the conventional cooling coils (not shown) of the cooling load 35, i.e., the space which is to be refrigerated by the cycle 10.

The outlet 36 of evaporator conduit 30 is connected by conduit 37 to the vapor inlet 38 of the shell 39 of the absorber 40. The liquid outlet 17 of the boiler 13 is connected through an expansion device 41 to the liquid inlet 42 of the absorber 40. The absorber 40 has internal baffling 43 to channel the flow of fluid through the interior of the absorber from the inlets 3 and 42 to the outlet 44. Pump 45 is connected between the absorber outlet 44 to the boiler inlet 16 to pump fluid from the absorber back into the boiler.

An improved 1R cycle 12 includes a multistage boiler 48, a multi-section regenerator 49, and a multistage resorber 50 which is thermally coupled to heat sink 51. The SER cycle also includes the condenser 22, expansion device 28 and evaporator 32 described above. The multistage boiler 48 has a plurality of conduits, or boiler stages, 48a–f receiving heat from an external source. As here shown, sections 48a–f extend through the interior of the absorber shell 39, each having an inlet 52, a liquid outlet 53 and a vapor outlet 54. The boiler stages 48a–f are serially connected, with the liquid outlet of a stage being connected to the inlet of the next stage through one of the expansion devices 55a–e, as shown in FIG. 2.

The multi-section regenerator 49 comprises a heat exchanger with an external shell 57, a liquid inlet 58, a vapor inlet 59 and internal baffling 61 which forms a plurality of serially connected sections within said shell to channel fluid entering the inlets in a serpentine manner through the interior of the shell to the outlet 62. The liquid inlet 58 is connected to the liquid outlet 53 of boiler stage 48f through an expansion device 63. The vapor inlet 59 is connected by conduit 64 to the outlet 36 of the evaporator 32.

The regenerator 49 includes a first set of conduits 65 extending through the serially connected sections of the regenerator and in heat exchange relation with fluid flowing through the sections, the conduits 65 being individually connected to the vapor outlets 54 of the boiler stages 48b–f. The regenerator 49 also has a conduit 66 through the serially connected sections thereof, conduit 66 having one end connected by conduits 67 and 68 to the vapor outlet 18 of boiler 13 and the vapor outlet 54 of the boiler stage 48a. Conduit 68 also has a portion thereof extending through the serially connected sections of the absorber 40. The conduit 66 through the regenerator has its outlet end connected by conduit 69 to the inlet 19 of the condenser 22.

The regenerator 49 further includes a second set of conduits 71a–g extending through the serially connected sections of the regenerator and in heat exchange relation with fluid flowing through the sections, the conduits 71 having their outlet ends 72 all connected together and to the highest pressure boiler stage 48a of the multistage boiler 48 from whence the vapor goes to line 68 and the liquid goes to liquid outlets 53.

The multistage resorber 50 includes a shell 76 with internal baffling 77 to channel cooling water through the shell from inlet 78 to outlet 79. The cooling water constitutes the heat sink 51 for the resorber. The multistage resorber has a plurality of conduits, or resorber stages 50b–g extending through the interior of shell 76, each resorber stage having liquid and vapor inlets 82 and 83 and an outlet 84. The inlet 82 of resorber stage 50g is connected to the outlet 62 of the regenerator shell. The resorber stages are serially connected with the outlet 84 of one stage being connected to the liquid inlet 82 of the next stage through one of the pumps 85b–f, as shown in FIG. 2. The outlets 84 of the resorber stages 50b–f, and the outlet 62a of the regenerator shell are all individually connected to the inlet ends 86 of the second set of regenerator conduits 71 by pumps 87a–g.

Operation of the ADR Cycle

The ADR cycle preferably uses ammonia/water or ammonia/brine as the refrigerant-absorbent working fluid pair, but may use other refrigerant-absorbent mixtures. The description below relates to the use of an ammonia/water pair. Although specific temperatures, pressures and concentrations are set forth, it is to be understood that these parameters are set forth merely to illustrate the operation and that the use of the invention is not limited thereto. It will be appreciated that different temperatures and pressures would be expected for optimum operation with different refrigerants.

The SEA cycle 11, taken by itself, operates in a conventional manner. A 10% ammonia/water solution is pumped by pump 45 into the inlet of boiler 13 at which point the pressure and temperature are 240 psia and 345° F., respectively. Heat from the burners 14 heat and boil the solution with the pressure and temperature at the outlet of the boiler being 240 psia and about 370° F. At this point, the mixture of liquid and vapor is separated into vapor going out the vapor outlet 18 and liquid exiting the liquid outlet 17. The liquid passes through the expansion valve 41 to reduce its pressure from 240 psia to 70 psia. The solution concentration at this point is about 5% $NH_3$. The vapor from the boiler 13 is cooled to 130° F. and rectified in conduit 66 in the regenerator and the $NH_3$ vapor then passes to the condenser 22. The cooling water absorbs heat from the high pressure $NH_3$ vapor and causes it to condense. The expansion valve 28 then reduces the pressure of the liquid ammonia from 240 psia to 70 psia, and the temperature drops to 40° F. These temperature and pressure conditions are given as a typical example, and other temperatures and pressures could be used. The liquid $NH_3$ will now absorb heat from the circulating brine solution from the cooling load and will boil. The 70 psia ammonia vapor will then go into the vapor inlet 38 of the absorber 40 and mix with the relatively weak $NH_3$/water solution coming into the absorber. The ammonia vapor is reabsorbed into the weak solution, producing heat of condensation, which is coupled with the SER cycle as the solution passes through the absorber 40 to its outlet 44. At this point the 10% ammonia/water solution will have a pressure and temperature of 70 psia and 250° F. The solution is then pumped back to boiler 13 and the cycle is repeated.

The above described SEA topping cycle 11 is absorber heat coupled to the 1R bottoming cycle 12 in that the heat generated by the absorption of ammonia back into the low concentration $NH_3$/water solution from boiler 13 is transferred to the boiler stages 48a–f of the 1R cycle boiler 4 to heat and boil the solutions therein. If desired, additional heat such as available waste heat may also be added here.

The boiling process is desired to be isothermal in nature, with the temperature being maintained substantially constant as the ammonia is progressively boiled off and the concentration of the remaining solution becomes weaker and weaker, and this is done by progressively decreasing the pressure in the boiling stages. For example, the fluid passing through the highest pressure (240 psia) boiler stage 48a will boil at 250° F. to 32% $NH_3$ concentration in the liquid. In order to further boil this concentration, at the 250° heat available from the absorber 40, the liquid from the boiler stage 48a is fed to the next boiler stage 48b, with its pressure being reduced to about 195 psia. This solution can now boil at 250° F. to a concentration of 27% $NH_3$ in the water. The liquid is again fed to the next boiler stage with its pressure being reduced so that it can again boil. Typical pressures in the boiler stages are: stage 48a, 240 psia; stage 48b, 195 psia; stage 48c, 160 psia; stage 48d, 130 psia; stage 48e, 105 psia; stage 48f, 85 psia. The liquid from the last boiler stage 48f is further reduced in pressure to 70 psia (the same as the exit pressure of evaporator 32) and has a very low (about 12% $NH_3$) concentration.

The vapor from the highest pressure boiler stage 48a passes to the condenser 22 along with the vapor from the boiler 13. The vapor generated in each of the lower pressure stages 48b–f is collected at the vapor outlets 54 of these stages for reabsorption in the resorber 50 at stages of corresponding pressures, as set out more fully below.

The very weak solution from the boiler stage 48f is fed to the regenerator 49 and readily absorbs the ammonia vapor coming from the evaporator 32. This absorption process continues throughout the serpentine path through the regenerator, at essentially constant pressure (70 psia), and produces heat at gradually reduced temperatures from the inlet to the outlet as the solution becomes progressively richer in $NH_3$. Typically the temperature will be about 240° F. in the inlet section of the regenerator and about 130+ in the outlet section. The liquid leaving the regenerator outlet 62 will have a 40% $NH_3$ concentration.

Most of the liquid from the regenerator 49, together with any remaining unabsorbed ammonia vapor, will now pass to the lowest pressure (70 psia) stage 50g of the resorber 50 wherein the flow of cooling water through the resorber will cool the mixture to become all liquid at the outlet of stage 50g. The remainder of the liquid and vapor from outlet 62 of regenerator 49 is pumped up to the high pressure by pump 87g and into conduit 71g of the regenerator. As in the boiler 48, it is desired to have an isothermal reabsorption process, with the cooling water maintaining the temperature of all of the resorber stages 50b–g at about 120° F. Part of the liquid from resorber stage 50g is pumped by pump 85f to the next highest pressure (85 psia) stage 50f wherein it mixes with the vapor from the 85 psia boiler stage 48f. Even though the stage 48f is at the same temperature (120° F.), the liquid can now absorb the incoming vapor because of the higher pressure. The heat of condensation produced is absorbed and removed from the resorber by the cooling water. Liquid from each resorber stage is then pumped to the next highest pressure stage for absorption of the vapor from the corresponding pressure stage of the boiler. That is, the pressures of the resorber stages are: stage 50f, 85 psia; stage 50e, 105 psia; stage 50d, 130 psia; stage 50c, 160 psia; and stage 50b, 195 psia.

The liquid from the resorber stage 50b is then pumped to the high pressure conduit 71a (240 psia). Since this solution is very strong (about 80% $NH_3$), it can start to boil at 130° F. in the first section of the regenerator. In order to provide thermal balance in the regenerator, pumps 87b–g pump specific amounts of liquid from the outlet 84 of each resorber stage 50c–g and the outlet 62a of the regenerator 49 to the high pressure conduits 71b–g, respectively. The liquids in each of these conduits will boil because of the increasing temperature towards the inlet section of the regenerator. The outlets of all of the high pressure (240 psia) conduits 71b–g are connected to the high pressure boiler stage 48a wherein final boiling occurs. The liquid remaining after final boiling is removed from boiler stage 48a at outlet 53.

The regenerator is adiabatic in performance in that the high pressure vapor produced therein is generated primarily by the heat of condensation of the low pressure ammonia from the evaporator 32 as it is absorbed into the low pressure and low concentration fluid from the last boiler stage 48f. Some heat in the regenerator is also absorbed into the low pressure fluid flowing therethrough from the high temperature ammonia vapors flowing through conduits 65 and 66.

For ideal isothermal operation of the 1R boiler 48, with boiling taking place at the same temperature as the pressure is reduced from condenser pressure to evaporator pressure, the boiler 48 would have to have an infinite number of stages in which the pressure gradually reduces, since the temperature span through which the solution boils in each stage depends on the number of pressure levels between the condenser and evaporator pressures. In FIG. 2 boiling takes place at six decreasing pressure levels. Fewer stages and fewer pressure levels will increase the temperature span in each stage and will decrease the performance, while more stages will increase performance. On the other hand, the greater the number of stages, the greater the total cost of the system. Thus, the number of stages to use will depend on balancing the desired performance with the cost of obtaining that performance.

The number of stages of the boiler 48 will, of course, determine the number of stages of the resorber 50. However, as above, the greater the number of stages, the more isothermal the absorption will be and the greater the theoretical performance of the cycle.

In the ADR cycle described above, the greatest portion of the high pressure ammonia vapor delivered to the condenser 32 comes from the regenerator 49 of the SER cycle, rather than from the boiler 13 of the SEA cycle. This decoupling of heat input from vapor generation allows the heat input to occur at a constant temperature independent of fluid properties and heat sink temperatures, which is important to high performance operation.

The input temperature of the ADR cycle is limited by fluid pair properties to about 500° F.

TER Cycle

Figure 3:
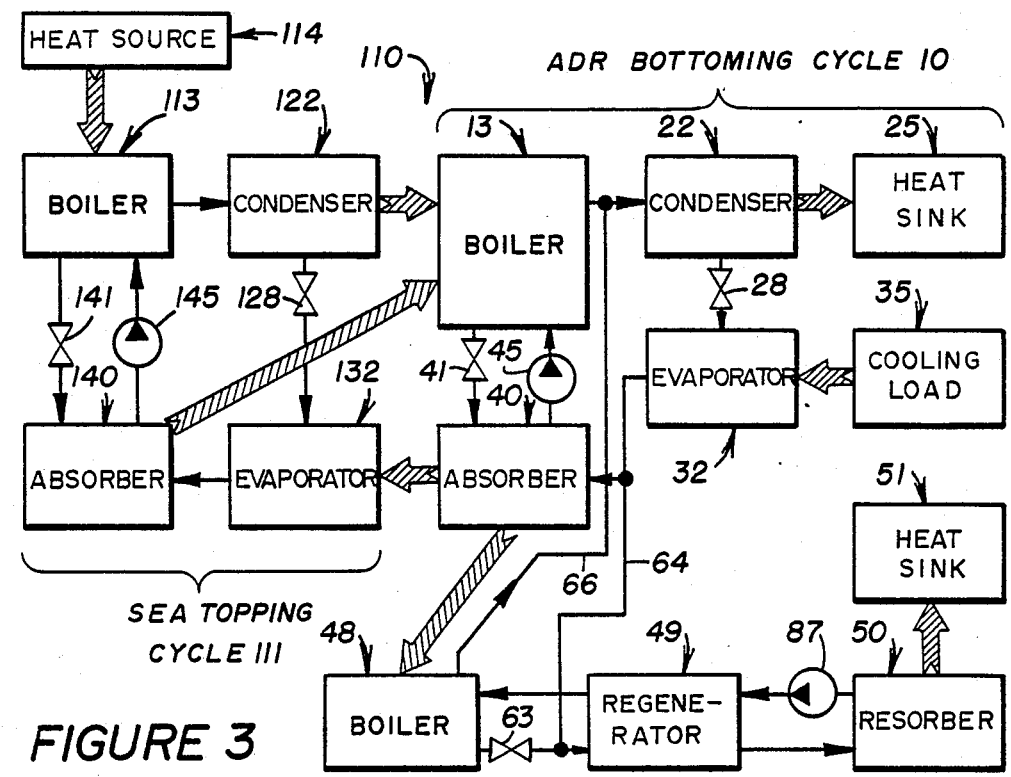
FIG. 3 is a block diagram of an absorber-coupled triple-effect regenerative refrigeration cycle embodying the present invention.

The multi-effect regenerative cycle 110 shown in FIG. 3 comprises a single-effect absorption cycle (SEA cycle) 111 as the topping subcycle, thermally coupled to an ADR cycle 10 as described below.

In this embodiment, the SEA topping subcycle is substantially the same as that described above in connection with the SEA cycle 11 of the ADR cycle, and includes a boiler 113 heated by a heat source 114, (such as a gas burner), a condenser 122, an expansion device 128, an evaporator 132, and an absorber 140, the latter being connected to boiler 113 by the expansion device 141 and pump 145 all operatively connected together to function as a single-effect absorption cycle in a manner as described previously.

The ADR bottoming cycle 10 also includes all of the components, and functions in the same manner as described previously, except for the heat couplings with the SEA topping cycle 111 as follows.

In particular, instead of being heated by burner 14, the boiler 13 of the ADR cycle is now thermally coupled to the condenser 121 and absorber 140 to receive heat therefrom as indicated by the shaded arrows. The thermal couplings between the absorber 140 and condenser 122 and boiler 13 may be carried out by any conventional heat exchanger. For example, the absorber 140 may be in the form shown by absorber 40, with a shell through which vapor from evaporator 132 and liquid from boiler 113 circulate as absorption takes place, and with boiler 13 being formed as a coil or the like in the interior of the shell of absorber 140 to be heated by the heat of absorption. Condenser 122 may be in the form as that of condenser 22, with liquid circulating from the shell of condenser 122 to a coil in heat exchange relative with the fluid pumped by pump 45 to boiler 13.

The absorber 40 of the ADR cycle is also heat coupled to evaporator 132. The evaporator 132 may be in the form as that of evaporator 31 with a fluid-filled coil in absorber 40 being used to absorb heat from absorber 40, the fluid then flowing through the shell of evaporator 132 to boil the fluid flowing through the evaporator.

The SEA topping cycle 111 is fluidly separated from the ADR bottoming cycle, thus enabling a different working fluid pair to be used. For example, the working fluid pair in the SEA topping cycle 111 is preferably either lithium bromide/water ($LiB_2/H_2O$) or sodium hydroxide/water ($NaOH/H_2O$), which will permit a high input temperature to the TER cycle of about 700° F. (at 300 psia) to produce the same refrigerating temperature of the cooling load as with the ADR cycle alone. The disclosed TER cycle must, of course, be operated such that the heat generated in the absorber 140 is at a sufficiently high temperature to provide the necessary boiling operation of boiler 13.

The foregoing description of the preferred embodiments have been presented for the purposes of illustration and description. It is not intended to be exhaustive or to limit the invention to the precise features described, and obviously many modifications and variations are possible in light of the above teaching. The embodiments were shown in order to explain most clearly the principles of the invention and the practical applications thereby to enable others in the art to utilize most effectively the invention in various other modifications as may be suited to the particular use contemplated. It is intended that the scope of the invention be defined by the claims appended hereto.

What is claimed is:

1. An absorber-coupled multi-effect regenerative cycle comprising:
   (a) a single-effect absorption cycle having
      (i) a boiler having an inlet and liquid and vapor outlets,
      (ii) a condenser having an inlet connected to said boiler vapor outlet and having an outlet,
      (iii) an evaporator having an inlet and an outlet,
      (iv) means for connecting and reducing the pressure from said condenser outlet to said evaporator inlet,
      (v) an absorber having inlets connected to said evaporator outlet and the said boiler liquid outlet and having an outlet,
      (vi) means for pumping fluid from said absorber outlet to said boiler inlet,
   (b) a single-effect regenerative cycle having
      (i) a multistage boiler having a plurality of boiling stages each with an inlet and liquid and vapor outlets, means for serially connecting said boiler stages with the liquid outlet of one connected to the inlet of the next, and means for progressively reducing the internal pressure of the successive boiling stages,
      (ii) a multistage resorber having a plurality of absorber stages each having liquid and vapor inlets and an outlet, means for serially connecting the absorber stages with the outlet of one connected to the liquid inlet of the next, and means for progressively increasing the internal pressure of the successive absorber stages,
      (iii) means for cooling and maintaining said resorber stages at a substantially constant temperature,
      (iv) a multi-section regenerator having a shell, liquid and vapor inlets, an outlet, and means forming a plurality of serially connected sections within said shell for flow of fluid from said inlet to said outlet, (v) means for connecting the liquid outlet of the lowest pressure boiler stage to said regenerator liquid inlet, (vi) means for connecting the outlet of said regenerator to the inlet of the lowest pressure resorber stage, (vii) means for individually connecting the vapor outlets of all but the highest pressure boiling stage to the vapor inlets of all but the lowest pressure resorber stages, (viii) means for connecting the outlet of the highest pressure resorber stage through said serially connected sections of said regenerator and in heat exchange relation with fluid flowing through said sections, and then to the inlet of said highest pressure boiler stage, (ix) means for connecting the vapor outlet of the highest pressure boiler stage to said condenser inlet, (x) means for connecting said evaporator outlet to the vapor inlet of said regenerator, (c) means for coupling said absorber of said single-effect absorption cycle and said multistage boiler of said single-effect regenerative cycle for transfer of heat from said absorber to said multistage boiler.

2. An absorber-coupled multi-effect regenerative cycle as set forth in claim 1, and further including a set of conduits extending through said serially connected sections of said regenerator and in heat transfer relation with fluid flowing through said sections, said conduits all having one end thereof connected to the inlet of the highest pressure boiler stage of said multi-stage boiler, said set of conduits being at the same pressure as that of said highest pressure boiler stage, and means for individually pumping fluid from each of the outlets of all but the highest pressure resorber stages to one of the conduits of said set.

3. An absorber-coupled multi-effect regenerative cycle as set forth in claim 2, and further including another set of conduits extending through said serially connected sections of said regenerator and in heat transfer relation with fluid flowing through said sections, and means for individually connecting each of the vapor outlets of all but the highest pressure boiler stage of said multistage boiler through a different one of the conduits of said another set and then to the inlets of said resorber stages.

4. An absorber-coupled multi-effect regenerative cycle as set forth in claim 3, and further including a conduit extending through said serially connected sections of said regenerator and in heat transfer relation with fluid flowing through said sections, said conduit being in fluid communication with the vapor outlets of both the boiler of said single-effect absorption cycle and the boiler said single-effect regenerative cycle and in fluid communication with the inlet of said condenser.

5. An absorber-coupled multi-effect regenerative cycle as set forth in claim 1, and further including a conduit extending through said serially connected sections of said regenerator and in heat transfer relation with fluid flowing through said sections, said conduit being in fluid communication with the vapor outlets of both the boiler of said single-effect absorption cycle and the boiler of said single-effect regenerative cycle and in fluid communication with the inlet of said condenser.

6. An absorber-coupled multi-effect regenerative cycle as set forth in claim 1, wherein said single-effect absorption cycle and said single-effect regenerative cycle together include a working fluid pair including ammonia and either water or brine.

7. An absorber-coupled multi-effect regenerative cycle as set forth in claim 1, and further including (d) a second single-effect absorption cycle having (i) a second boiler having an inlet, and liquid and vapor outlets, (ii) a second condenser having an inlet connected to the vapor outlet of said second boiler, and having an outlet, (iii) a second evaporator having an inlet and an outlet, (iv) means for connecting and reducing the pressure from the outlet of said second condenser to the inlet of said second evaporator, (v) a second absorber having inlets connected to the outlet of said second evaporator and to said liquid outlet of said second boiler, and having an outlet, (vi) means for pumping fluid from the outlet of said second absorber to the inlet of said second boiler (e) and wherein said second absorber is coupled to said boiler of said first-named single-effect absorption cycle for transfer of heat from said second absorber to said boiler.

8. An absorber-coupled multi-effect regenerative cycle as set forth in claim 7, and wherein said absorber of said first-named single-effect absorption cycle is coupled to said second evaporator for transfer of heat from said absorber to said second evaporator.

9. An absorber-coupled multi-effect regenerative cycle as set forth in claim 7, and wherein said second condenser is coupled to said boiler of said first-named single-effect absorption cycle for transfer of heat from said second condenser to said boiler.

10. An absorber-coupled multi-effect regenerative cycle as set forth in claim 7, wherein said first named single-effect cycle and said single-effect regenerative cycle together includes a working fluid pair, and wherein said second single-effect cycle includes a different working fluid pair.

11. An absorber-coupled multi-effect regenerative cycle as set forth in claim 7, wherein said first named single-effect cycle and said single-effect regenerative cycle together include a working fluid pair which includes ammonia and either water or brine and wherein said second single-effect absorption cycle includes a working fluid pair of either lithium bromide or sodium hydroxide and water.

12. A single effect regenerative absorption cycle comprising:

(a) a multistage boiler having a plurality of boiling stages each with an inlet and liquid and vapor outlets, means for serially connecting said boiler stages with the liquid outlet of one connected to the inlet of the next, and means for progressively reducing the internal pressure of the successive boiling stages, (b) The means for heating and maintaining said boiler stages at a substantially constant temperature, (c) a multistage resorber having a plurality of absorber stages each having liquid and vapor inlets and an outlet, means for serially connecting the absorber stages with the outlet of on connected to the liquid inlet of the next, and means for progressively increasing the internal pressure of the successive absorber stages, (d) means for cooling and maintaining said resorber stages at a substantially constant temperature,
(e) a multi-section regenerator having a shell, liquid and vapor inlets, an outlet, and means forming a plurality of serially connected sections within said shell for flow of fluid from said inlet to said outlet,
(f) means for connecting the liquid outlet of the lowest pressure boiler stage to said regenerator liquid inlet,
(g) means for connecting the outlet of the said regenerator to the inlet of the lowest pressure resorber stage,
(h) means for individually connecting the vapor outlets of all but the highest pressure boiling stage to the vapor inlets of all but the lowest pressure resorber stages,
(i) a set of conduits extending through said serially connected sections of said regenerator and in heat transfer relation with fluid flowing through said sections, said conduits all having one end thereof connected to the inlet of the highest pressure boiler stage of said multistage boiler, said set of conduits being at the same pressure as that of said highest pressure boiler stage, and means for individually pumping fluid from each of the outlets of all of said pressure resorber stages to one of the conduits of said set,
(j) a condenser having an inlet connected to the vapor outlet of the highest pressure boiler of the highest pressure boiler stage, and having an outlet,
(k) an evaporator having an inlet and an outlet,
(l) means for connecting and reducing the pressure from said condenser to said evaporator inlet, and
(m) means for connecting said evaporator outlet to the vapor inlet of said regenerator.

* * * * *